United States Patent [19]
Duncan et al.

[11] 3,837,318
[45] Sept. 24, 1974

[54] AUTOMATIC MILKER RELEASE

[75] Inventors: Lloyd P. Duncan; J. Nathan Oberg, both of Washington, Mo.

[73] Assignee: Zero Manufacturing Company, Washington, Mo.

[22] Filed: Aug. 7, 1972

[21] Appl. No.: 278,356

Related U.S. Application Data

[63] Continuation-in-part of Ser. No. 80,028, Oct. 12, 1970, abandoned.

[52] U.S. Cl.......... 119/14.08, 119/14.14, 119/14.17
[51] Int. Cl. .............................................. A01j 5/14
[58] Field of Search.......... 119/14.08, 14.14, 14.15, 119/14.17

[56] References Cited
UNITED STATES PATENTS

| | | | |
|---|---|---|---|
| 952,978 | 3/1910 | Cramp | 119/14.08 |
| 3,115,116 | 12/1963 | Schilling et al. | 119/14.08 |
| 3,556,053 | 1/1971 | Padman et al. | 119/14.08 |
| 3,690,300 | 9/1972 | Tonelli | 119/14.08 |

Primary Examiner—Hugh R. Chamblee
Attorney, Agent, or Firm—Mason, Mason & Albright

[57] ABSTRACT

A milker with a claw, receiver and teat cups connected to a pulsator has a valve in a vacuum line leading from the receiver to a milk collector line. The valve is associated with the milker so that when milk stops flowing from the receiver, ambient pressure is admitted to the interior of the receiver. The teat cups are then released from the animal and at the same time, the collector line is valved shut to preserve its vacuum. In addition to a valve that admits atmospheric pressure in the receiver, an electric light can be used. With each device, an operator can see that the flow of milk to the collector line has stopped.

12 Claims, 9 Drawing Figures

PATENTED SEP 24 1974 3,837,318

INVENTORS
LLOYD P. DUNCAN

BY Mason, Mason & Albright
ATTORNEYS

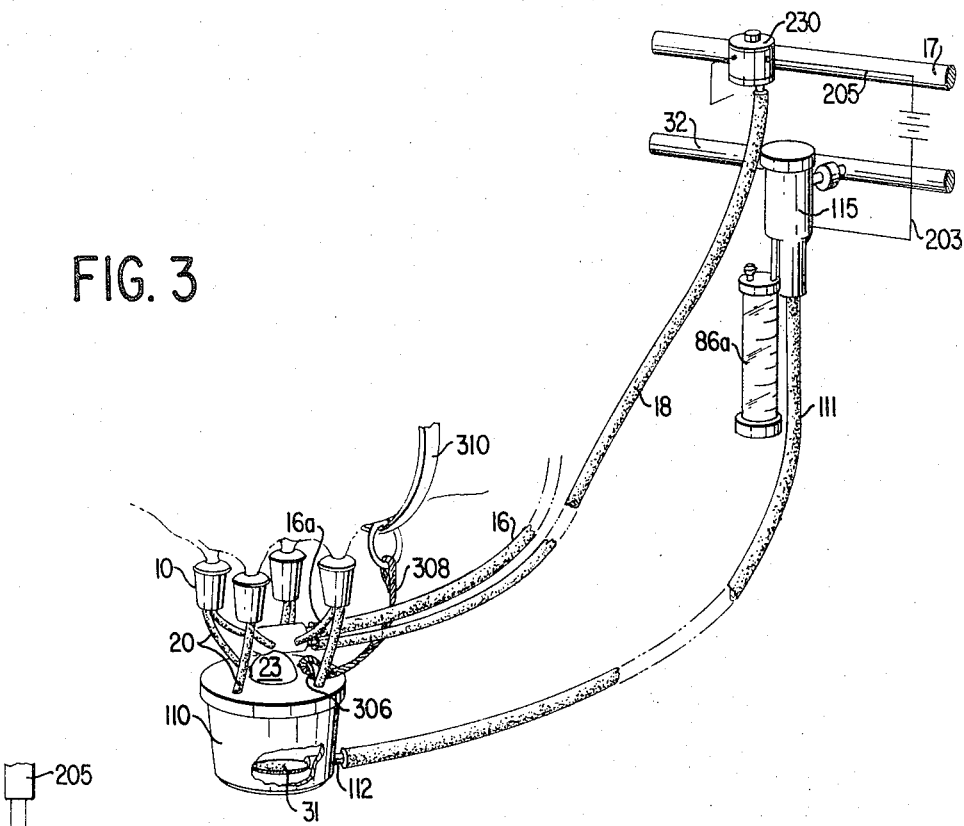
FIG. 3
FIG. 5
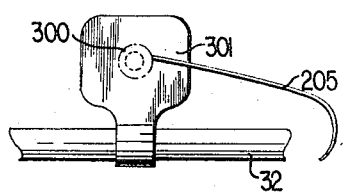
FIG. 6
INVENTORS
LLOYD P. DUNCAN

PATENTED SEP 24 1974 3,837,318

AUTOMATIC MILKER RELEASE

This application is a continuation-in-part of application Ser. No. 80,028 filed Oct. 12, 1970 now abandoned.

In the drawings:

FIG. 3 is an enlarged view of the FIG. 1 system.

FIG. 5 is an exploded view of the valve which controls the vacuum admitted to the milker.

FIG. 6 is a view of an alternative warning device.

Figure 1:
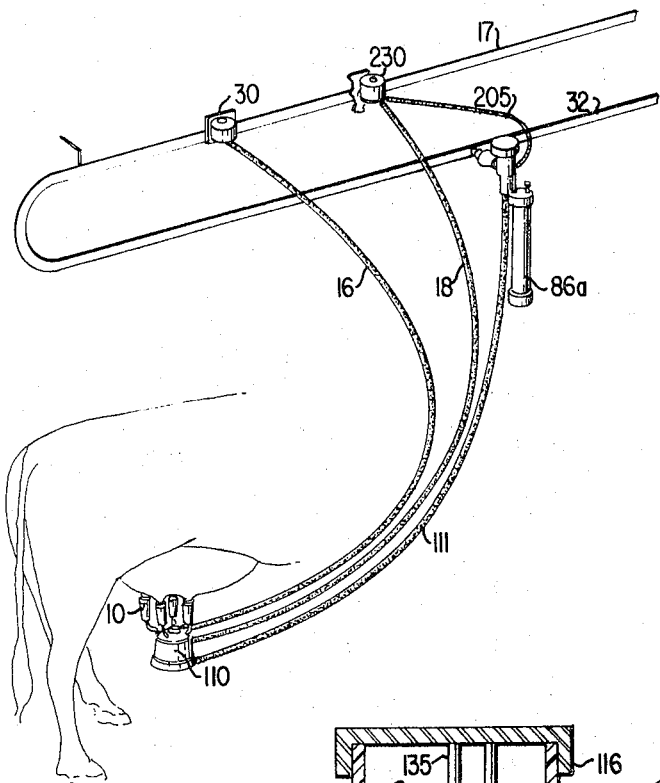
FIG. 1 is a prospective view of the dual vacuum system and milker in operation.

According to copending application Ser. No. 684,897 filed Nov. 13, 1967, now U.S. Pat. No. 3,538,768, a milk measuring device is connected to the milk receiver and also is connected to a pipeline so that milk moves to the pipeline through the milk measuring device. With particular reference to the FIGS. 12 – 16 embodiment of this patent, and the modification thereof shown in the drawings of the instant application, a dual vacuum system is employed so that a relatively lower vacuum, say 10 inches of mercury, is applied to the upper portion of the receiver 110 through line 17 and hose line 18 as well as the teat cups 10, pulsator 30 and solenoid valve 230. A valve 1 such as that disclosed in U.S. Pat. No. 3,479,008 maintains the difference in vacuum. A higher vacuum, in the order of about 17 inches of mercury, is applied to the valved outlet nipple 112 and milk in the lower portion of the pail as well as the milk proportioning device 115 and the vacuum line 32 leading to a bulk collection tank. The tube 136 is of relatively small size allowing milk to pass around same including the small portion to conduit 134.

As milk is drawn through the measuring device, including the upper cylindrical portion 117, with cap 116, a cylinder plug 121 is raised, permitting a high portion of milk to pass through the device 115 to line 32 via nipples 130, 132 and coupling 131, while a small portion is communicated to a calibrated milk measuring container 86a through tube 120 and conduit 134. This latter portion collected in container 86a, bears a direct functional relationship to the distance the valve 122 is raised off its seat 124, out of aperture 125, and the total amount of milk being drawn from the receiver. Check valve 127 permits milk to be discharged into upper portion 117 after a cow has been milked and the milk measured.

Figure 2:
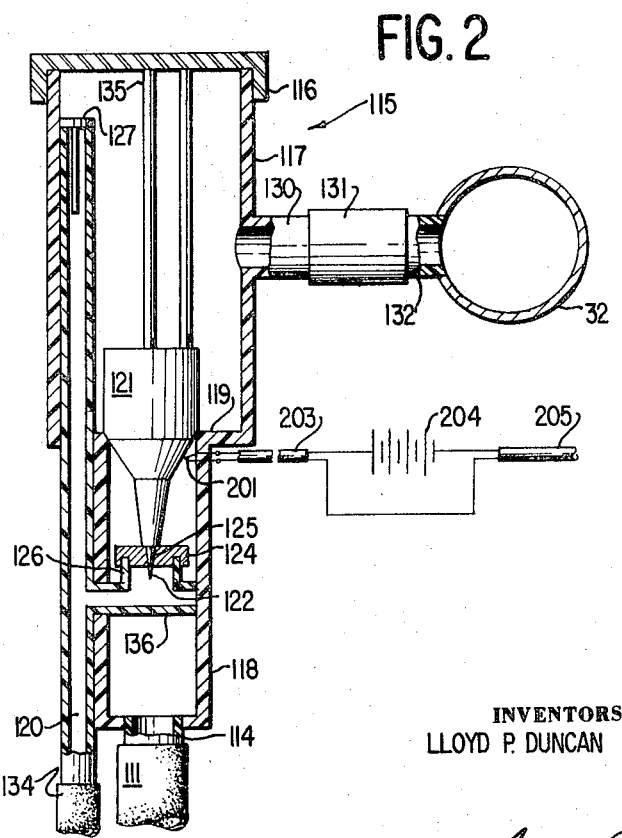
FIG. 2 is a section of a portion of the milk measuring device.
Figure 4:
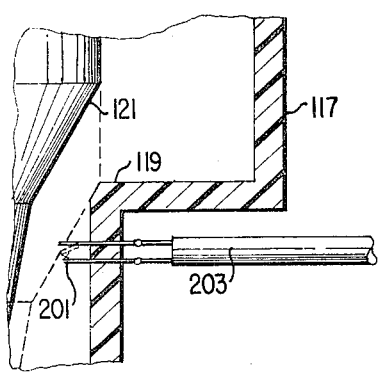
FIG. 4 is a fragmentary view of the casing of the milk measuring device.

The needle valve 122 is part of the plug 121 which is raised along fins 135 by the flow of milk to line 32. Once the milk stops flowing through collector line 111 and the proportioning part 115, plug 121 falls so that needle valve 122 rests on seat 124 supported on casing 126. As seen in FIG. 2, the shoulder of plug 121 rests on seat 119 of the lower cylindrical portion 118 when in the lowermost position and needle 122 is seated. Contacts 201 are mounted in casing 117 so that the upper contact is flexed in contact with the lower contact to complete a circuit when plug 121 is in its lowermost position (FIG. 4). Contacts 201 are each connected to their respective wires, 203, which lead to a circuit breaker in the circuit connecting the terminals of battery 204 to a solenoid 220 in valve 230 via wire 205. Contacts or probes 201 can be housed in a nipple 504 shown in FIG. 8. Also, the wire 205 could lead to a signal light 300 mounted on a bracket 301 on pipe 32 (FIG. 6) and wires 203 arranged to complete the circuit.

Preferably, however, the circuit through the value 230 is interrupted to open hose line 18 to atmospheric air and pressure while preserving the vacuum in line 17. Relieving the vacuum established in line 18 also restores atmospheric pressure in the upper portion of receiver 110 through manifold connection 23 as well as hoses 20 leading to the teat cups 10 in casings 11. A timer delay is preferably associated with the solenoid 220 to delay opening the receiver 110 to atmospheric pressure. The teat cups, once exposed to atmospheric pressure, automatically drop off the cow's teats and the entire claw and receiver assembly becomes displaced from the cow. A strap 310 and connection 308 is attached to bracket 306 on the claw to prevent the assembly from falling on the floor of the milking parlor. Alternatively, the assembly could fall into a bowl or bracket type randel that moves the milker assembly into the operator's aisle.

A conventional pulsator 30 of the pulsating type includes the usual disc timer connected to a solenoid to intermittently apply vacuum to the shells of the teat cups through line 16 and hoses 16a and is connected to vacuum line 17 so that the inflations are subject to alternate vacuum and atmospheric pressure exposures. In the embodiment shown, the coil 220 of valve 230 is connected to circuit line 205 which, when broken, opens line 18 to atmospheric air. Opening hose line 18 to atmospheric pressure also relieves the partial vacuum established in the receiver 110 and hoses 20 so that the teat cups fall entirely off the animal, indicating completion of milking.

In FIG. 5, completion of the circuit through contacts 201 operates solenoid 220 to drop plug 221 on its seat 222.

Valve 230 is a metal jacketed solenoid which has an enlarged passage 224 in which plug 221 is loosely fitted. A lower valve portion 230a is normally coupled tight against the bottom of the valve 230 so that plug 221 rests on its seat 222 blocking passage of air to nipple 17a, connected to vacuum line 17, through seat 222 and opening 227 in the side wall of seat 222. Opening 227 leads to line 18 and normally establishes a constant vacuum in receiver 110 when plug 221 is raised. When current to valve 230 is interrupted, plug 221, being weighted, slides down through passageway 224 to rest on seat 222 and seal line 17. Since plug 221 is only loosely fitted in passageway 224, atmospheric air is admitted through aperture 225 to opening 227 and, ultimately, to the interior of the receiver 110, permitting the teat cups to fall from the animal. When current is applied, plug 221 is moved by solenoid coil 220 up to seal aperture 225.

With respect to the dual vacuum system, the preferred embodiment of the present invention has particular advantages. It will be appreciated that the float valve 31 in receiver 110 seals the exit to line 111 once the milk has been substantially completely withdrawn from the receiver as more fully described in Ser. No. 684,897, now U.S. Pat. No. 3,538,768, and in the embodiment disclosed in U.S. Pat. No. 3,373,720. Thus, once a cow has been finished giving milk, there normally is a short delay before valve 31 shuts line 111. The plug 121 forms a liquid seal in portion 117 only after the milk has been exhausted from the teat cups, and their hoses 20, as well as receiver 110. The plug thus constitutes valve means between the receiver and the collector line. Because there is a short delay before milk has been completely drained from receiver 110, the plug 121 is normally not seated to falsely release or signal completion of milking when temporary interruptions occur.

When the teat cups fall off the animal, there is no spilling or back-flushing of milk as occurs in conventional milker cut offs. Moreover, float valve 31 also seals the milk exit from the bottom of receiver 110 to maintain the vacuum in line 32 to which other milkers are attached. Also, air is excluded from contacting or bubbling through any milk in the line 111 after the teat cups are released. As an added advantage, an operator can invert the teat cups and immerse the entire unit, upside down in wash solution, while the float valve still seals the exit from the receiver to line 111. With this arrangement, an operator can quickly wash each milker unit without disconnecting same from the vacuum lines and service a large number of cows each milking period.

Figure 7:
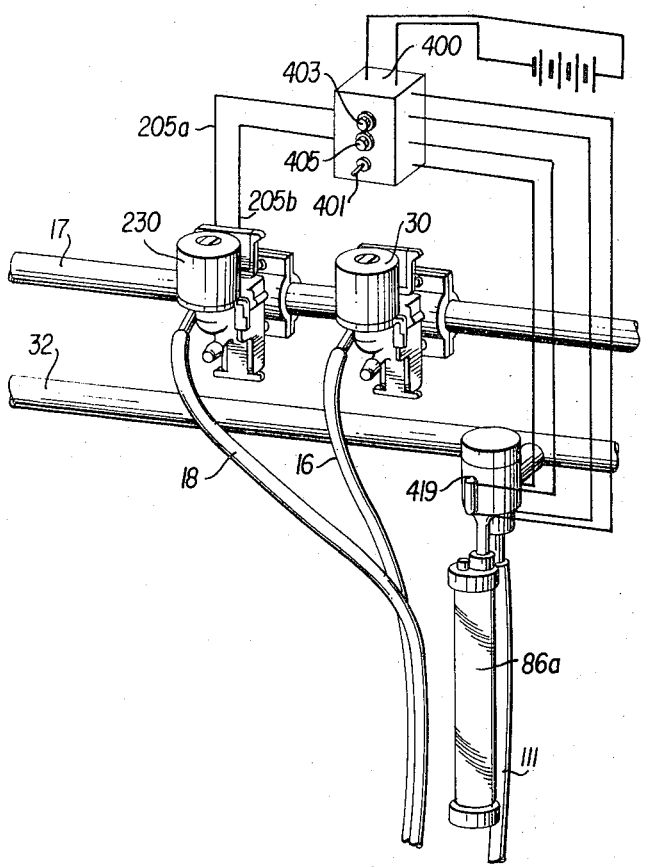
FIG. 7 is a prospective view of a modified system similar to that of FIG. 1.
Figure 8:
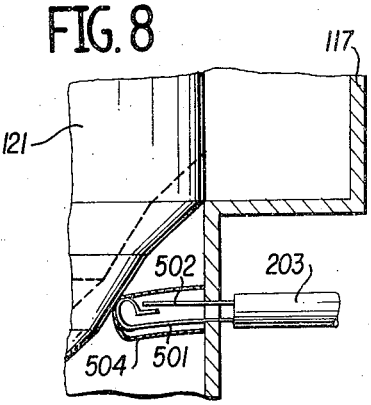
FIG. 8 is a fragmentary view of the casing of the milk measuring device with a modified probe arrangement.
Figure 9:
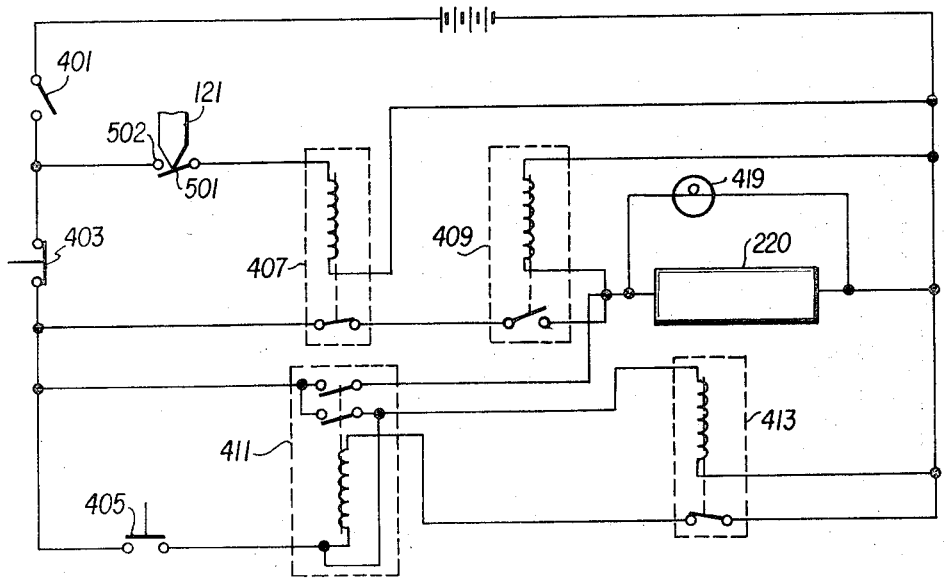
FIG. 9 is a circuit diagram of the FIG. 7 system.

In FIGS. 7 – 9, a similar system to that of FIGS. 1 – 6 is shown with a control box 400 located adjacent the pulsator 30 and valve 230. Control box 400 has push buttons 401, 405 and 403 as master switch, "on" switch and "off" switch respectively. As seen in the circuit drawing, switch 401 must be closed before any of the circuit controls solenoid 220. Once switch 401 is closed, but before milking is started, push button switch 405 is operated to activate solenoid 220 before milk flows to the measuring device of FIG. 2 to raise plug 121. Thus, the operator sets the relay 413 open for a desired period of time, say ½ – 2 minutes.

In FIG. 8, the FIG. 2 casing 117 is shown with modified probes 501 and 502 normally in electrical contact and housed within a waterproof nipple 504 made of thin rubber or plastic. When plug 121 falls to the dotted line position, the nipple 504 is distorted and probe 501 is depressed as the shoulder of the plug contacts the curled end of probe 501 breaking electrical contact so that current to solenoid 220 is interrupted. Lower probe 501 is longer than 502 and is curled at its outer end to ensure better contact with plug 121 and a complete current break. When this happens, ambient pressure is allowed in milker receiver 110 so that teat cups 10 and receiver 110 drop from the cow.

In FIG. 9, master toggle switch 401 is turned on causing time delay relay 407 to be energized closing the circuit for a short time, i.e., 30 – 60 seconds. Then push button "on" switch 405 is depressed allowing current to flow through time delay relay 413 for a longer period, say 1 – 2 minutes so that current passes through relay 411 and 409 closing the latter's switch, and to solenoid 220 thus establishing a partial vacuum in receiver 110 and the unit can be placed on the cow. After the predetermined period of time, 1 – 2 minutes, relay 413 opens and current through relay 411 is discontinued. However, the flow of milk through device 115 has raised plug 121 allowing probes 501 and 502 to contact, thus permitting solenoid 205 to operate. Current then flows through contacts 501 and 502 de-energizing relay 407 but through its closed switch and then through switch 409 to solenoid 220 maintaining plug 221 in raised position.

When milking is complete, the flow of milk ceases and plug 121 falls breaking contact between probes 501 and 502 and the timer in time delay relay 407 sets, allowing current to continue flowing for a short period of time, whereupon the circuit to relay 407 is broken and current to solenoid 220 stops, allowing valve plug 221 to seat. The reason for time delay relay 407 is to prevent the premature dropping of valve plug 221 when a cow stops milking momentarily. "Stop" push button switch 403 is normally closed but can be operated to discontinue current to solenoid 220 without the necessity of completely shuting current off through master switch 401 so that light 419 functions. The light is connected in parallel across solenoid 220 to indicate the solenoid's condition for an operator to see from a distance.

While a dual vacuum system has been described above, the present invention also has application to conventional milking systems in which a single vacuum is applied. With the conventional milker, the solenoid valve establishes atmospheric pressure in the receiver permitting the teat cups to fall off as disclosed herein. At the same time, the solenoid closes a valve in the milk line 32 leading from the receiver to the bulk milk tank and many of the advantages realized in the preferred embodiment would obtain in conventional, single vacuum units.

In copending application Ser. No. 850,033 filed Aug. 14, 1969, now U.S. Pat. No. 3,586,043, a milking valve is disclosed that fits in the lower portion of the wall of a milk receiver. Only a single vacuum is applied to the teat cups and the collector line as in a conventional milking system. The valve is manually operated to admit ambient pressure in the container and simultaneously shut the milk outlet in the bottom of the receiver which leads to a collector line. The broad concept expressed in the disclosure of the instant application likewise is applicable, at least in part, to a single vacuum system in which the receiver can be vented to the atmosphere by a manually operated valve. Hence, opening the receiver to ambient pressure results in simultaneously valving shut the milk outlet at the bottom of the receiver which preserves the vacuum in the collector line as well as to prevent any milk from flowing back into the receiver. Further, the receiver thus valved can be inverted and washed without any of the wash solution being sucked into the collector line as discussed above.

The preferred embodiment shown in the drawings depends on electrical contacts which are actuated by a float plug in a milk proportioning device. Obviously, magnetic proximity devices can be substituted for electrical contacts and a pneumatic signal instead of the electrical circuit shown can be used to valve the receiver open to ambient pressure and insure that the milk outlet is closed.

What is claimed is:

1. A milking system comprising a receiver and teat cup assembly connected therewith, said receiver being connected to a first line in flow communication with a first vacuum circuit means, a second milk collector line connected to a valved outlet provided in a bottom portion of said receiver and in flow communication with a second higher vacuum circuit means, a seatable valve in said milk collector line movable to an unseated position upon flow of milk in said milk collector line, a movable valve means in said first line movable to a position whereby vacuum is established in said first line or positive pressure is established in said first line and means responsive to the closing of said seatable valve to actuate said movable valve means and establish a positive pressure in said first line whereby said teat cup assembly will be released from an animal and vacuum in each of said circuit means is preserved.

2. A system according to claim 1, wherein said movable valve means has an air aperture that is opened to admit air to the first line, receiver and teat cup assembly when said positive pressure is established.

3. A milking system comprising a receiver and teat cup assembly connected therewith, said receiver being connected to a first line in flow communication with a first vacuum circuit means, a second milk collector line connected to a valved outlet provided in a bottom portion of said receiver and in flow communication with a second vacuum circuit means, a seatable valve in said milk collector line movable to an unseated position upon flow of milk in said milk collector line, a movable valve means in said first line movable to a position whereby vacuum is established in said first line or positive pressure is established in said first line and electrical means responsive to the closing of said seatable valve to actuate said movable valve means and establish a positive pressure in said first line whereby said teat cup assembly will be released from an animal and vacuum in each of said circuit means is preserved.

4. The system of claim 3, wherein said valve is contained in a housing and electrical contact probes are placed in communication with one another by movements of said valve, said probes being electrically associated with said valve means.

5. The system of claim 4, wherein said valve means is a solenoid valve which shuts the communication from said first vacuum circuit means to said receiver when said contact probes are placed in communication with one another.

6. The system of claim 5, wherein said probes extend within the housing for said valve and said valve comprises a valve body which moves substantially vertically responsive to the flow of milk whereby at least one of said probes is flexed by the movement of said valve body.

7. The system of claim 6, wherein said probes and said valve means are in an electrical circuit which includes time delay relay means whereby electrical communication between said probes and said valve means can be established after a predetermined period of time.

8. The system of claim 7, wherein said probes are connected to a light in said electrical circuit.

9. The system of claim 4, wherein said probes are contained in an electrical circuit and said electrical circuit includes signal means which is responsive to the movements of said valve means.

10. The system of claim 3, wherein said first line is under a relatively lower vacuum than the vacuum in said second circuit means and milk collector line, the outlet in said receiver having a float valve which closes the opening upon the withdrawal of milk from said receiver to maintain a dual vacuum system.

11. A milking system comprising a receiver and teat cup assembly connected therewith, said receiver being connected to a first line in flow communication with a first vacuum circuit means, a second milk collector line connected to a valved outlet provided in a bottom portion of said receiver and in flow communication with a second vacuum circuit means, a seatable valve in said milk collector line movable to an unseated position upon flow of milk in said milk collector line, a solenoid valve means in said first line movable to a position whereby vacuum is established in said first line or positive pressure is established in said first line and electrical means responsive to the closing of said seatable valve to actuate said solenoid valve means and establish a positive pressure in said first line whereby said teat cup assembly will be released from an animal and vacuum in each of said circuit means is preserved.

12. The system of claim 11, wherein said solenoid valve means comprises a slideable plug in an apertured housing and the movements of said plug alternatively admit ambient pressure and establish a partial vacuum from said first vacuum circuit means.

* * * * *